(12) United States Patent
Hammer et al.

(10) Patent No.: US 8,048,390 B2
(45) Date of Patent: Nov. 1, 2011

(54) METHOD FOR THE SELECTIVE CATALYTIC REDUCTION OF NITROGEN OXIDES IN EXHAUST GASES OF VEHICLES

(75) Inventors: Benedikt Hammer, Tacherting (DE); Hans-Peter Krimmer, Kirchweidach (DE); Bernd Schulz, Waldkraiburg (DE); Eberhard Jacob, Krailling (DE)

(73) Assignee: Alzchem Trostberg GmbH, Trostberg (DE)

( * ) Notice: Subject to any disclaimer, the term of this patent is extended or adjusted under 35 U.S.C. 154(b) by 0 days.

(21) Appl. No.: 12/448,492

(22) PCT Filed: Dec. 20, 2007

(86) PCT No.: PCT/EP2007/011285
§ 371 (c)(1), (2), (4) Date: Oct. 27, 2009

(87) PCT Pub. No.: WO2008/077588
PCT Pub. Date: Jul. 3, 2008

(65) Prior Publication Data
US 2010/0047144 A1    Feb. 25, 2010

(30) Foreign Application Priority Data
Dec. 23, 2006   (DE) .................. 10 2006 061 377

(51) Int. Cl.
*B01D 11/00*   (2006.01)
*B01D 53/56*   (2006.01)
*C01C 1/02*    (2006.01)

(52) U.S. Cl. ........ 423/32; 423/213.2; 423/237; 423/352

(58) Field of Classification Search .................. None
See application file for complete search history.

(56) References Cited

U.S. PATENT DOCUMENTS

| | | | | |
|---|---|---|---|---|
| 4,789,743 A | * | 12/1988 | Becker | 544/325 |
| 5,120,695 A | * | 6/1992 | Blumrich et al. | 502/78 |
| 7,682,586 B2 | * | 3/2010 | Harold et al. | 423/352 |
| 2003/0221360 A1 | * | 12/2003 | Brown et al. | 44/301 |
| 2004/0040288 A1 | * | 3/2004 | Jacob et al. | 60/286 |
| 2005/0202971 A1 | * | 9/2005 | DiFrancesco et al. | 502/439 |
| 2006/0039843 A1 | * | 2/2006 | Patchett et al. | 423/239.1 |
| 2008/0286165 A1 | * | 11/2008 | Graupner et al. | 422/148 |

FOREIGN PATENT DOCUMENTS

| | | | |
|---|---|---|---|
| DE | 3815807 | * | 11/1989 |
| DE | 3815807 A1 | | 11/1989 |
| DE | 4221451 | * | 6/1992 |
| DE | 4221451 | * | 1/1994 |
| DE | 4221451 A1 | | 1/1994 |
| DE | 4417238 | * | 9/1994 |
| EP | 0342184 A2 | | 11/1989 |
| WO | WO-87/02023 A1 | | 4/1987 |
| WO | 9504211 | * | 2/1995 |
| WO | WO-95/04211 A1 | | 2/1995 |
| WO | 2005108289 | * | 11/2005 |

OTHER PUBLICATIONS

Piazzesi, Gaia, et al. "Isocyanic acid hydrolysis over Fe-ZSM 5 in urea-SCR" Catalysis Communications 7, 600-603 (2006).*

* cited by examiner

*Primary Examiner* — Melvin Mayes
*Assistant Examiner* — Sheng H Davis
(74) *Attorney, Agent, or Firm* — Fulbright & Jaworski L.L.P

(57) ABSTRACT

The invention relates to a method for the selective catalytic reduction of nitrogen oxides using ammonia in exhaust gases of vehicles, whereby solutions of guanidine salts with an ammonia forming potential of between 40 and 850 g/kg, optionally in combination with urea and/or ammonia and/or ammonium salts, are catalytically decomposed in the presence of catalytically active, non-oxidation-active coatings of oxides selected from the group containing titanium dioxide, aluminum oxide, silicon dioxide or the mixtures thereof, and hydrothermally stable zeolites which are fully or partially metal-exchanged. The guanidine salts according to the invention enable a reduction of the nitrogen oxides by approximately 90%. Furthermore, said guanidine salts can enable an increase in the ammonia forming potential from 0.2 kg, corresponding to prior art, up to 0.4 kg ammonia per litre of guanidine salt, along with freezing resistance (freezing point below −25° C.). The risk of corrosion of the guanidine salt solutions used according to the invention is also significantly reduced compared to that of solutions containing ammonium formiate.

21 Claims, 1 Drawing Sheet

Figure 1:
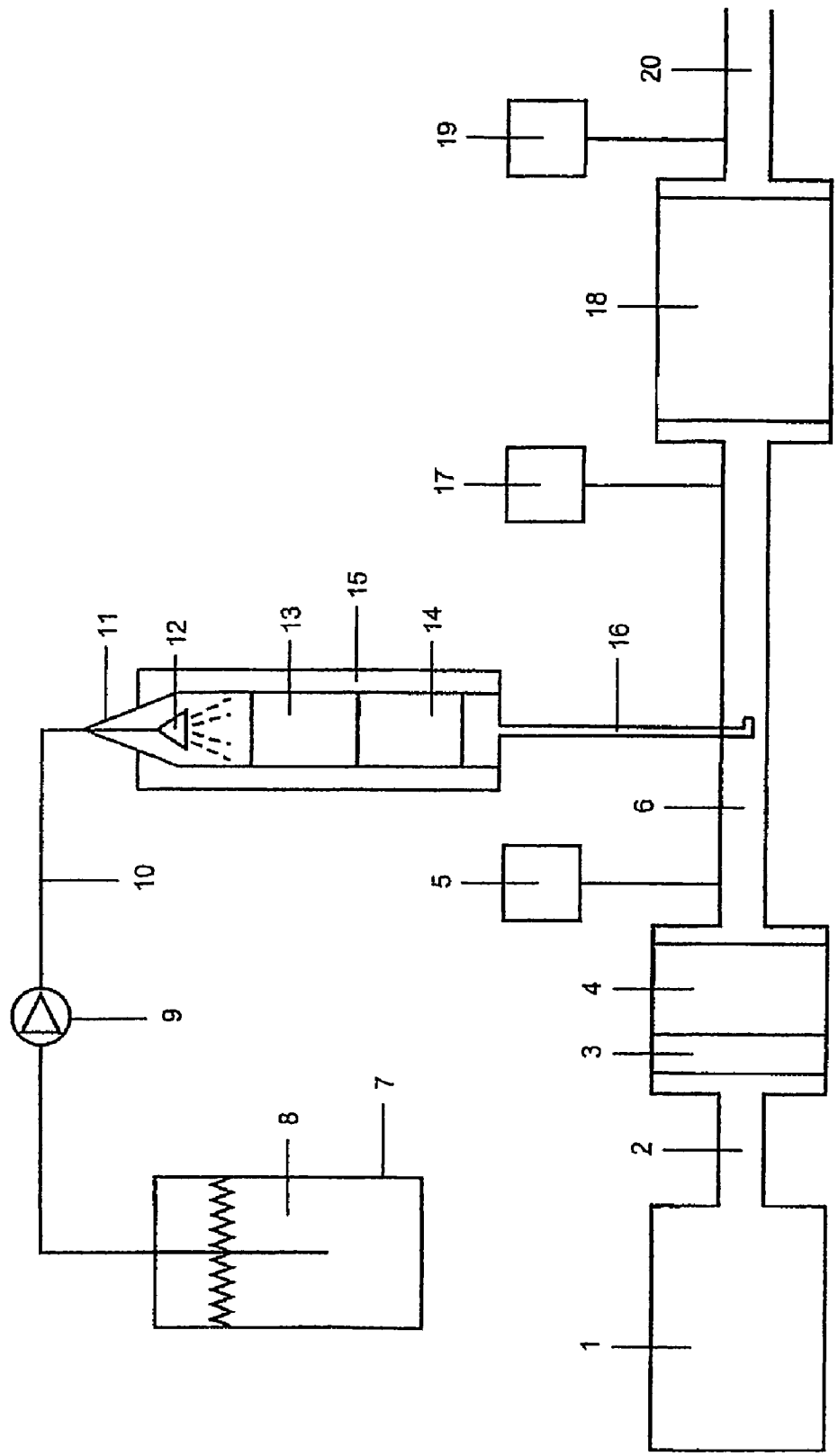

METHOD FOR THE SELECTIVE CATALYTIC REDUCTION OF NITROGEN OXIDES IN EXHAUST GASES OF VEHICLES

RELATED APPLICATIONS

This application is a §371 application from PCT/EP2007/011285 filed Dec. 20, 2007 which claims priority from German Application Serial No. 10 2006 061 377.5 filed Dec. 23, 2006, each of which is herein incorporated by reference in its entirety.

The present invention relates to a process for selective catalytic reduction of nitrogen oxides in exhaust gases of motor vehicles with the aid of guanidine salt solutions, wherein the guanidine salts in question produce ammonia by evaporation and catalytic decomposition, and this ammonia serves as a reducing agent for the subsequent selective catalytic reduction of the nitrogen oxides.

According to the prior art, ammonia ($NH_3$) serves as a reducing agent in the selective catalytic reduction of nitrogen oxides in oxygen-containing exhaust gases of motor vehicles, and is introduced upstream of a specific SCR catalyst, or upstream of a group of SCR catalyst modules which can be flowed through in parallel and are integrated in a muffler, into the exhaust gas line of combustion systems and internal combustion engines, especially that of internal combustion engines of motor vehicles, and brings about the reduction of the nitrogen oxides present in the exhaust gas in the SCR catalysts. SCR means Selective Catalytic Reduction of nitrogen oxides ($NO_x$) in the presence of oxygen.

For the production of ammonia, especially in vehicles, various liquid and solid ammonia precursor substances have become known to date, and are described in detail hereinafter.

In utility vehicles, the use of an aqueous eutectic solution of urea in water (AdBlue™) with a content of 32.5% by weight of urea, a freezing point of −11° C. and an ammonia-formation potential of 0.2 kg/kg has become established as an ammonia precursor substance. For operation of the SCR system at temperatures down to −30° C., i.e. down to the cold flow plugging point (CFPP, lower operating temperature) of the diesel fuel in winter quality, comparatively complex additional heating, which is prone to operational faults, of the tank, lines and valves is required for AdBlue use and for AdBlue logistics in cold climates in winter.

The ammonia required for the catalytic reduction of the $NO_x$ is formed in the thermal decomposition of the urea. For this purpose, the following reactions are relevant: urea cannot be evaporated but falls apart when heated primarily to give isocyanic acid (HNCO) and ammonia ($NH_3$) according to equation [1].

$$(H_2N_2)CO \rightarrow HNCO + NH_3 \quad [1]$$

The isocyanic acid can polymerize readily to nonvolatile substances such as cyanuric acid. This can give rise to operationally disruptive deposits on valves, on injection nozzles and in the exhaust gas pipe.

The isocyanic acid (HNCO) is hydrolyzed in the presence of water ($H_2O$) to ammonia ($NH_3$) and carbon dioxide ($CO_2$) according to equation [2].

$$HNCO + H_2O \rightarrow NH_3 + CO_2 \quad [2]$$

The reaction [2] proceeds very slowly in the gas phase. In contrast, it proceeds very rapidly over metal oxide and/or zeolite catalysts, and somewhat more slowly of the metal oxide catalysts which are strongly acidic as a result of their $WO_3$ content, such as the SCR catalysts based on a mixed oxide of vanadium oxide, tungsten oxide and titanium oxide.

In the known applications of urea-SCR catalyst systems connected to motor vehicles, the engine exhaust gas is generally utilized with exploitation of the heat content thereof for thermal decomposition of the urea according to reaction [1]. In principle, the reaction [1] may proceed as early as upstream of the SCR catalyst, while reaction [2] has to be accelerated catalytically. In principle, reactions [1] and [2] can also proceed over the SCR catalyst, whose SCR activity is reduced as a result.

For countries in a cold climate, it is advantageous to be able to use a freezeproof ammonia precursor substance. Addition of ammonium formate to the solution of urea in water allows the freezing point to be lowered significantly. This makes additional heating superfluous and achieves considerable savings in the production and logistics costs. A solution of 26.2% ammonium formate and 20.1% urea in water possesses a freezing point of −30° C. and is commercially available under the name Denoxium 30 and can advantageously replace AdBlue™ in the cold seasons (SAE technical papers 2005-01-1856).

The addition of ammonium formate to the solution of urea in water allows, in the case of a solution of 35% ammonium formate and 30% urea in water, the ammonia formation potential to be increased from 0.2 kg/kg to 0.3 kg/kg. This increases the range of the vehicle by one third with one filling of the ammonia precursor substance, and generally increases the possibility of long-term filling between the inspection intervals in passenger vehicles. One disadvantage of this measure is the rise in the freezing point of the solution to the range from −11 to −15° C. (Denoxium January 2005, www.kemira.com).

EP 487 886 A1 proposes a process for the quantitative decomposition of an aqueous solution of urea in water by hydrolysis to ammonia ($NH_3$) and carbon dioxide ($CO_2$) in a temperature range from 160 to 550° C., in which the result is the prevention of formation of undesired isocyanic acid and of solid conversion products thereof. In this known method, the urea solution is first sprayed by means of a nozzle on to an evaporator/catalyst present within or outside the exhaust gas. For aftertreatment, the gaseous products formed are passed over a hydrolysis catalyst in order to achieve quantitative formation of ammonia.

EP 555 746 A1 discloses a method wherein the evaporator, owing to its configuration, distributes the urea solution homogeneously such that contact of the droplets with the channel walls of the decomposition catalyst is ensured. A homogeneous distribution prevents deposits on the catalysts and reduces the slippage of excess reducing agent. The urea metering should be activated only at exhaust gas temperatures from 160° C., since undesired deposits are formed when the temperature is lower.

The conversion of ammonium formate as an ammonia precursor substance to ammonia is possible by injection of the aqueous solution into the hot exhaust gas through simple sublimation without any special pretreatment. A disadvantage is a simultaneous release of the very corrosive formic acid and the possible reformation of ammonium formate on the surface of the SCR catalyst at exhaust gas temperatures below 250° C. The pore system of the SCR catalyst is blocked in a thermally reversible manner.

It was therefore an object of the present invention to develop a process for selective catalytic reduction of nitrogen oxides with ammonia in exhaust gases of motor vehicles, which does not have the cited disadvantages according to the prior art, but with which technically simple production of ammonia for the reduction of $NO_x$ levels by the SCR process is enabled, and no undesired by-products are formed in the decomposition.

This object is achieved in accordance with the invention by decomposing solutions of guanidine salts with an ammonia formation potential of 40 to 1000 g/kg, especially to 850 g/kg, in the presence of catalytically active, oxidation-inactive coatings of oxides, selected from the group of titanium dioxide, aluminum oxide, silicon dioxide and hydrothermally stable metal zeolites or mixtures thereof. Preferably in accordance with the invention, the solutions of guanidine salts are used, optionally in combination with urea and/or ammonia and/or ammonium salts.

This is because it has been found that, surprisingly, with the aid of the process according to the invention, a reduction in the nitrogen oxides in motor vehicle exhaust gases by approx. 90% can be achieved. Moreover, with the guanidine salts proposed in accordance with the invention, an increase in the ammonia formation potential from 0.2 kg according to the prior art up to 0.4 kg of ammonia per liter of guanidine salt with simultaneous winter stability (freezing point below −25° C.) is possible.

For selective catalytic reduction of nitrogen oxides with ammonia in oxygen-containing or oxygen-free exhaust gases of motor vehicles, according to the invention, guanidine salts which have an ammonia formation potential of 40 to 1000 g/kg, especially 80 to 850 g/kg and more preferably 250 to 600 g/kg, are used. Particular preference is given here to guanidine salts of the general formula (I)

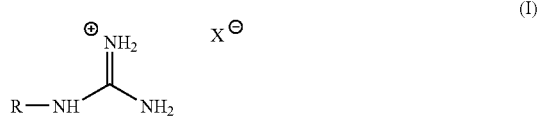

(I)

where
R=H, $NH_2$, $C_1$-$C_{12}$-alkyl,
$X^-$=acetate, carbonate, cyanate, formate, hydroxide, methoxide and oxalate.

In the context of the present invention, it is easily possible to use a mixture of two or more different guanidine salts. Preference is given in accordance with the invention to using solutions of guanidine salts which have a content of guanidine salts of 5 to 85% by weight, especially 30 to 80% by weight and preferably 5 to 60% by weight. In a preferred embodiment, the guanidine salts used in accordance with the invention are combined with urea and/or ammonia and/or ammonium salts. The mixing ratios of guanidine salt with urea and ammonia or ammonium salts may vary within wide limits, though it has been found to be particularly advantageous that the mixture of guanidine salt and urea possesses a guanidine salt content of 5 to 60% by weight and a urea content of 5 to 35% by weight, especially 10 to 30% by weight. In addition, mixtures of guanidine salts and ammonia or ammonium salts with a content of guanidine salt of 5 to 60% by weight and of ammonia or ammonium salt of 5 to 40% by weight, especially 10 to 35% by weight, are considered to be preferred.

Useful ammonium salts in this context have been found, in particular, to be compounds of the general formula (II)

(II)

where
R=H, $NH_2$, $C_1$-$C_{12}$-alkyl,
$X^-$=acetate, carbonate, cyanate, formate, hydroxide, methoxide and oxalate.

The guanidine salts used in accordance with the invention and if appropriate the further components consisting of urea or ammonium salts are used in the form of a solution, the solvents used with preference being, in particular, water and/or a $C_1$-$C_4$-alcohol. The aqueous and/or alcoholic solutions here have a preferred solids content of 5 to 85% by weight, especially 30 to 80% by weight.

The solution of the guanidine salt or of the mixtures of guanidine salts, if appropriate, also in combination with urea, in water possesses a preferred ammonia formation potential of 0.2 to 0.5 kg of ammonia per liter of solution, especially 0.25 to 0.35 kg of ammonia per liter of solution.

It is considered to be essential to the invention that the guanidine salts and, if appropriate, the further components are subjected to a catalytic decomposition to ammonia in the preferred temperature range from 150 to 350° C., the further components formed being carbon dioxide and optionally carbon monoxide. This decomposition of the guanidine salts to ammonia is undertaken here in the presence of catalytically active, oxidation-inactive coatings of oxides, selected from the group of titanium dioxide, aluminum oxide and silicon dioxide and mixtures thereof, or/and hydrothermally stable zeolites which have been fully or partly metal-exchanged, especially iron zeolites of the ZSM 5 or BEA type. Useful metals here are especially the transition group elements and preferably iron or copper. The corresponding Fe zeolite material is prepared by known methods, for example, the solid-state exchange method, for example with $FeCl_2$, then applied in the form of a slurry to the substrate (for example cordierite monolith) and dried or calcined at higher temperatures (approx. 500° C.).

The metal oxides such as titanium oxide, aluminum oxide and silicon dioxide and the mixtures thereof are preferably applied to metallic carrier materials, for example heat conductor alloys (especially chromium-aluminum steels).

The guanidine salts or the remaining components can preferably also be catalytically decomposed to ammonia and carbon dioxide, with or without carbon monoxide, in which case, in addition to a catalyst with oxidation inactive coatings, a catalyst with oxidation-active coatings of oxides is used, selected from the group of titanium dioxide, aluminum oxide and silicon dioxide and mixtures thereof, or/and hydrothermally stable zeolites which have been fully or partly metal-exchanged, the coatings having been impregnated with gold and/or palladium as oxidation-active components. The corresponding catalysts comprising palladium and/or gold as active components preferably have a noble metal content of 0.001 to 2% by weight. With the aid of such oxidation catalysts, it is possible to prevent the undesired formation of carbon monoxide as a by-product in the decomposition of the guanidine salts as early as in the course of ammonia production.

Preferably, for the catalytic decomposition of the guanidine salts and if appropriate of the further components, a catalytic coating comprising palladium or/and gold as active components with a noble metal content of 0.001 to 2% by weight, especially 0.01 to 1% by weight, is used.

It is possible in the context of the present invention that a catalyst consisting of two sections is used, in which case the first section comprises oxidation-inactive coatings and the second section oxidation-active coatings. Preferably, 5 to 90% by volume of this catalyst consists of oxidation-inactive coatings and 10 to 95% by volume of oxidation-active coatings. Alternatively, the catalytic decomposition can also be performed in the presence of two catalysts arranged in series, in which case the first catalyst comprises oxidation-inactive coatings and the second catalyst oxidation-active coatings.

The catalytic decomposition of the guanidine salts used in accordance with the invention and if appropriate the further components to ammonia can be undertaken within the exhaust gas in a main stream, partial stream or secondary stream, or outside the exhaust gas in an autobaric and extraneously heated arrangement of the motor vehicle exhaust gases.

With the aid of the guanidine salts proposed in accordance with the invention, it is possible to achieve a reduction in the level of the nitrogen oxides in exhaust gases of vehicles by approx. 90%. Finally, the risk of corrosion of the guanidine salt solutions used in accordance with the invention is also reduced significantly compared to solutions comprising ammonium formate.

The examples which follow are intended to illustrate the invention in detail.

EXAMPLES

Example 1

Use of an Aqueous 40% by Weight Guanidinium Formate Solution (GF) (m.p.<−20° C.) as an Ammonia Precursor Substance in an Autobaric Ammonia Generator According to the Description of FIG. 1

An automobile engine 1 produces an exhaust gas stream of 200 m$^3$ (STP)/h, which is passed through the inter-mediate pipe 2 over a platinum oxidation catalyst 3 and a particulate filter 4 into the exhaust gas inter-mediate pipe 6. The exhaust gas composition measured with the FTIR gas analyzer 5 in the intermediate tube 6 is: 150 ppm of nitrogen oxide, NO; 150 ppm of nitrogen dioxide, $NO_2$; 7% carbon dioxide, $CO_2$; 8% water vapor, 10 ppm of carbon monoxide, CO.

In a tank vessel 7, there is a GF solution 8 which is sprayed by means of a metering pump 9 through a feed line 10 and a nozzle 12 into a reactor 11. The reactor 11 consists of a vertical tube heated to 250° C., which has internal diameter 51 mm, is made of austenitic steel and possesses a heating jacket 15. The catalysts 13 and 14 are present in the reactor 11. The catalysts are metal carriers (diameter 50 mm, length 200 mm, manufacturer of the metal carriers: Emitec GmbH, D-53797 Lohmar) coated with titanium dioxide from Südchemie AG, Heufeld, Germany. The catalyst 13 is based on a coarse-cell MX/PE 40 cpsi carrier type, length 100 mm. In the downstream direction, the catalyst 14 consists of the fine-cell MX/PE 200 cpsi carrier type, length 100 mm. The end face of the coarse cell catalyst 13 is sprayed with a GF solution 8 by means of a pressure metering pump 9 from a nozzle 12. The nozzle 12 is arranged axially in the reactor 11 and upstream of the coarse-cell catalyst 13. The water content of the GF solution 8 is evaporated over the catalyst 13 and the GF is decomposed thermo-hydrolytically over catalysts 13 and 14 such that the formation of the urea and isocyanic acid, HNCO, intermediates is prevented.

The mixture of ammonia, carbon dioxide, carbon monoxide and water vapor formed is introduced via the feed pipe 16 into the exhaust gas intermediate pipe 6 upstream of an SCR catalyst 18 at 300° C. into the exhaust gas (200 m$^3$ (STP)/h) of the automobile engine 1 which has been pretreated with the catalyst 3 and the filter 4. The dosage of the GF solution 8 is regulated with the pressure metering pump 9 such that an ammonia concentration of 270 ppm can be measured with the FTIR gas analyzer 17. At the same time, there is a rise in the CO concentration by 90 to 100 ppm as a result of the decomposition of the formate content of the GF solution 8. As expected, the rise in the $CO_2$ content and water vapor content as a result of the evaporation and decomposition of the GF solution 8 is low and almost impossible to measure. The catalytic hydrolysis of the GF is complete, since no isocyanic acid, HNCO, can be detected with the gas analyzer 17 and no deposits of urea and the decomposition products thereof can be detected.

Downstream of the SCR catalyst 18, the FTIR gas analyzer 19 measures a reduction in the concentration of NO and $NO_2$ by 90% to 30 ppm. At the same time, there is complete reaction of the ammonia, $NH_3$, with NO and $NO_2$ to give nitrogen, $N_2$. The concentration of the ammonia downstream of the SCR catalyst 19 is <2 ppm.

The FTIR gas analyzers 5, 17 and 19 enable a simultaneous exhaust gas analysis of the components NO, $NO_2$, CO, $CO_2$, $H_2O$, ammonia, $NH_3$, and isocyanic acid, HNCO.

Example 2

The procedure is analogous to Example 1, except that the titanium dioxide catalyst 14 is replaced by a palladium oxide-titanium dioxide catalyst, the titanium dioxide having been impregnated with an aqueous $Pd(NO_3)_2$ solution so as to form, after the drying and calcination (5 hours at 500° C.), a catalyst which contains 1% by weight of PdO (=approx. 0.9% by weight of Pd), which brings about a partial oxidation of the carbon monoxide. No rise in the CO concentration is measurable at the FTIR gas analyzer 17.

Example 3

The procedure is analogous to Example 1, except that a 15% by weight diguanidinium carbonate solution is used instead of the 40% by weight guanidinium formate solution. The reactor 11 is likewise heated at 250° C.; the catalysts 13 and 14 are identical to those of Example 1.

No by-product is detected (<1 ppm) at the gas analyzer 17; the $CO_2$ rise at around 40 ppm is as expected; at the gas analyzer 19, a reduction in the concentrations of NO and $NO_2$ by around 92% to 25 ppm is detectable.

Example 4

The procedure is analogous to Example 1, except that the catalysts 13 and 14 consist of $Al_2O_3$ and the reactor 11 is operated at a temperature of 350° C.

In the gas analyzer 17, the only by-products measured are CO (80 ppm) and HCN (<10 ppm); downstream of the SCR catalyst, a reduction in the NO and $NO_2$ by 85% to 45 ppm both no HCN is measured at the gas analyzer 19.

The invention claimed is:

1. A process for selective catalytic reduction of nitrogen oxide which is present in exhaust gas of a motor vehicle, by ammonia, comprising catalytically decomposing at least one guanidine salt with an ammonia formation potential of from 80 g/kg to 850 g/kg in solution, in the presence of a catalytically active oxidation inactive coating of at least one oxide selected from the group consisting of titanium dioxide, aluminum oxide, and silicon dioxide, or a hydrothermically stable zeolite to form ammonia, and contacting said ammonia to said exhaust gas, upstream of an SCR catalyst, and downstream of an engine, wherein said guanidine salt has the formula:

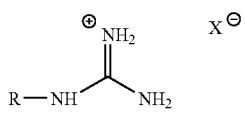

wherein

R is H, NH, or $C_1$-$C_{12}$-alkyl, and $X^-$ is selected from the group consisting of acetate, cyanate, formate, hydroxide, methoxide and oxalate.

2. The process of claim 1, wherein said solution further comprises at least one of urea, ammonia, and an ammonium salt.

3. The process of claim 1, wherein said hydrothermically stable zeolite has been at least partially metal exchanged.

4. The process of claim 1, comprising two or more different guanidine salts.

5. The process of claim 1, wherein said at least one guanidine salt has an ammonia formation potential of from 250 g/kg to 600 g/kg.

6. The process of claim 2, wherein said solution contains from 5% to 60% by weight of said at least one guanidine salt, and from 5% to 35% by weight of urea.

7. The process of claim 2, wherein said solution contains from 5% to 60% by weight of said at least one guanidine salt, and from 5% to 40% by weight ammonia or ammonia salt.

8. The process of claim 2, wherein said ammonia salt has formula:

where

R=H, $NH_2$, $C_1$-$C_{12}$-alkyl, $X^-$=acetate, carbonate, cyanate, formate, hydroxide, methoxide and oxalate.

9. The process of claim 1, comprising a solvent for said at least one guanidine salt selected from the group consisting of water, a $C_1$-$C_4$ alcohol, and mixtures thereof.

10. The process of claim 9, wherein said solvent has a solids content of from 5% to 85% by weight.

11. The process of claim 10, wherein said solvent has a solids content of from 30% to 80% by weight.

12. The process of claim 1, wherein said solution has an ammonia formation potential of from 0.2 kg to 0.5 kg of ammonia per liter of solution.

13. The process of claim 12, wherein said ammonia formation potential is from 0.25 kg/l to 0.35 kg/l.

14. The process of claim 1, wherein said at least one guanidine salt is catalytically decomposed to ammonia within an exhaust gas system in a main stream, a partial stream, or a secondary stream of said vehicle exhaust gas, or outside of said exhaust gas, in an autobaric and extraneously heated arrangement.

15. The process of claim 1, said process further comprising using a catalyst with an oxidation active coating.

16. The process of claim 15, wherein said oxidation active coating is a titanium dioxide, aluminum oxide, silicon dioxide, a hydrothermically stable metal zeolite and mixtures thereof, wherein said oxidation active coating is impregnated with at least one of gold or palladium.

17. The process of claim 15, wherein said oxidation active coating contains an active component consisting of at least one of gold and palladium, in an amount ranging from 0.001% to 2.0% by weight.

18. The process of claim 1, comprising using a two part catalyst, the first part comprising an oxidation inactive coating and the second part comprising an oxidation active coating.

19. The process of claim 18, wherein from 5% to 90% by volume of said catalyst is an oxidation inactive coating and from 10% to 95% by volume of said catalyst is an oxidation active coating.

20. The process of claim 1, comprising using two catalysts in series, wherein the first catalyst is an oxidation inactive coating and the second catalyst is an oxidation active coating.

21. The process of claim 1, comprising catalytically reducing said guanidine salt solution at a temperature from 150° C. to 350° C.

* * * * *